(12) United States Patent
Singhal

(10) Patent No.: US 10,136,391 B2
(45) Date of Patent: Nov. 20, 2018

(54) SYSTEM AND METHOD TO ENHANCE BATTERY LIFE IN CELL PHONE DEVICES

(76) Inventor: Tara Chand Singhal, Torrance, CA (US)

(*) Notice: Subject to any disclaimer, the term of this patent is extended or adjusted under 35 U.S.C. 154(b) by 162 days.

(21) Appl. No.: 13/450,179

(22) Filed: Apr. 18, 2012

(65) Prior Publication Data

US 2013/0178205 A1 Jul. 11, 2013

Related U.S. Application Data

(60) Provisional application No. 61/631,527, filed on Jan. 5, 2012.

(51) Int. Cl.
*H04W 60/02* (2009.01)
*H04W 52/02* (2009.01)
*H04W 60/04* (2009.01)

(52) U.S. Cl.
CPC .... *H04W 52/0251* (2013.01); *H04M 2250/10* (2013.01); *H04W 60/02* (2013.01); *H04W 60/04* (2013.01); *Y02D 70/1222* (2018.01); *Y02D 70/1242* (2018.01); *Y02D 70/164* (2018.01)

(58) Field of Classification Search
USPC ............ 455/127.5, 574, 456.1–456.6, 404.2, 455/435.1
See application file for complete search history.

(56) References Cited

U.S. PATENT DOCUMENTS

| | | | |
|---|---|---|---|
| 5,732,350 A * | 3/1998 | Marko et al. | 455/435.1 |
| 6,236,861 B1 * | 5/2001 | Naor | H04W 60/04 455/433 |
| 6,330,446 B1 | 12/2001 | Mori | |
| 6,542,716 B1 | 4/2003 | Dent et al. | |
| 8,254,924 B2 | 8/2012 | Prakash et al. | |
| 8,340,650 B2 * | 12/2012 | Yamashita et al. | 455/418 |
| 8,670,788 B1 * | 3/2014 | Vargantwar et al. | 455/458 |
| 2005/0165514 A1 * | 7/2005 | Kamdar et al. | 701/2 |
| 2005/0232200 A1 * | 10/2005 | Jeong et al. | 370/331 |
| 2006/0286982 A1 * | 12/2006 | Prakash | H04W 60/00 455/435.1 |
| 2007/0224968 A1 * | 9/2007 | Boland | H04L 63/083 455/411 |
| 2009/0191873 A1 * | 7/2009 | Siegel et al. | 455/435.2 |
| 2009/0252103 A1 * | 10/2009 | Harris | 370/329 |

(Continued)

FOREIGN PATENT DOCUMENTS

CN 101233778 A 7/2008

OTHER PUBLICATIONS

International Search Report PCT/US2012/069770.

(Continued)

*Primary Examiner* — Charles Appiah
*Assistant Examiner* — Edward Zhang
(74) *Attorney, Agent, or Firm* — Steve Roeder, Esq

(57) ABSTRACT

A system that enhances life of a battery in cell phone devices that work in conjunction with a cellular telephone network has a Registration-Request Signal transmission management function that operates in the device and periodically detects change in physical location of the device from an immediate prior location, called an LchangeDelta. The function, if the LchangeDelta is below a threshold of change in location, suppresses an Registration-Request Signal transmission from the device to the cellular network, thus enhancing battery life.

20 Claims, 12 Drawing Sheets

---

At step 100, detecting periodically, in the device, a change in physical location of the device from an immediate prior location, the change called an LchangeDelta;

At step 102, suppressing a Registration-Request Signal transmission from the device to the cellular network, if the LchangeDelta is below a threshold.

At step 104, not suppressing the prior art Registration-Request Signal transmission from the device to the cellular network, if the LchangeDelta is above a threshold At step 106, using the same location change periodic detection period with which a prior art device transmits a Registration-Request Signal to the network.

At step 108, computing a rate of change of location and if the rate is above a threshold, for a rapidly moving location, do not suppress the prior art Registration-Request Signal transmission to the network.

At step 110, receiving a previous and a current location of the device from a combination of a GPS function and a gyro in the device.

(56) References Cited

U.S. PATENT DOCUMENTS

| | | |
|---|---|---|
| 2010/0015990 A1 | 1/2010 | Gallagher |
| 2010/0248640 A1 | 9/2010 | MacNaughtan |
| 2010/0255840 A1* | 10/2010 | Itamiya et al. ............ 455/435.1 |
| 2010/0321206 A1 | 12/2010 | Kuga et al. |
| 2011/0039581 A1* | 2/2011 | Cai et al. ................... 455/456.4 |
| 2011/0159862 A1* | 6/2011 | Jackson ....................... 455/418 |
| 2012/0034915 A1* | 2/2012 | Arcidiacono et al. ........ 455/430 |
| 2012/0264426 A1* | 10/2012 | Kholaif et al. ............... 455/434 |

OTHER PUBLICATIONS

International Search Report PCT/US2012/069770 dated: Jul. 8, 2014.
EURO Search Report 12864350.9-1855 dated: Sep. 9, 2015, Jan. 8, 2016 PCT/US2012/069770.

* cited by examiner

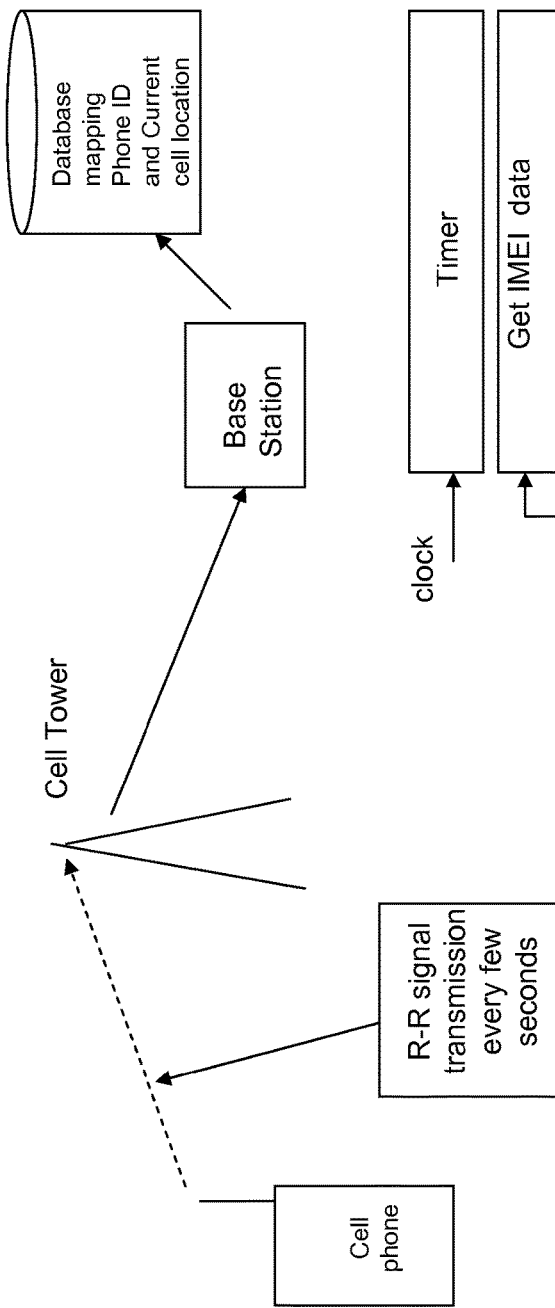

Device Location Change (DLC) Function 12 download and store boundary data in the device storage that defines cell space boundaries in a geographic region   58

Use the boundary data and the LChangeDelta to determine movement of device within and out of a cell space.   59

Update boundary data when the region changes   60

Figure 2D

Battery Life Enhancement Calculations in Standby Mode:

Battery Standby Mode life = 8 days

Number of R-R signal transmissions/day = 12x60x24= 17280
(based on every 5 sec.)

Number of R-R signal transmissions over battery life = 8x17280 = 138,240

Battery Capacity = 950 mAH

Assume, energy used in one transmission = 950/138,240 = 0.00687 mAH

Assume, typical usage = 2.4 hour movement in 24 hours that is
inter cell movement 10% of time and remain within a cell = 90% of time Therefore:
R-R Transmissions suppressed over standby life = 138,240x90% = 124,416

Battery Life saving over standby life = 124,416 x 0.00687 = 855 mAH

Battery use over standby life with 90% RR suppressed = (950-855) = 95 mAH

Battery use over one day standby = 95/8     = 12 mAH

Battery Life Enhancement = 950/12 = 80 days

Figure 4A

Battery Life Enhancement Calculations in Typical daily communication use mode:

Number of R-R signal transmissions /day = 12x60x24= 17,280
(based on every 5 sec.)

Battery Capacity = 950 mAH

Device communication use life = 3 hours

Battery required for communication phone use = 950/3 = 317 mAH/hour

Typical phone communication usage = 1.5 hours/day

Energy used in one R-R transmission = 0.00687 mAH

Typical usage = 2.4 hour move in 24 hours = inter cell movement 10% of time
= within cell = 90% of time Transmission suppressed = 17,280x90% = 15,552

Battery Life saving = 15,552 x 0.00687 = 107 mAH/day

Battery life extended for communication phone use = 107/317 = 2.7 hours

Battery life extended from 3 hours to 3 hours and 20 minutes.

Figure 4B

At step 100, detecting periodically, in the device, a change in physical location of the device from an immediate prior location, the change called an LchangeDelta;

At step 102, suppressing a Registration-Request Signal transmission from the device to the cellular network, if the LchangeDelta is below a threshold.

At step 104, not suppressing the prior art Registration-Request Signal transmission from the device to the cellular network, if the LchangeDelta is above a threshold At step 106, using the same location change periodic detection period with which a prior art device transmits a Registration-Request Signal to the network.

At step 108, computing a rate of change of location and if the rate is above a threshold, for a rapidly moving location, do not suppress the prior art Registration-Request Signal transmission to the network.

At step 110, receiving a previous and a current location of the device from a combination of a GPS function and a gyro in the device.

Figure 5

SYSTEM AND METHOD TO ENHANCE BATTERY LIFE IN CELL PHONE DEVICES

CROSS REFERENCE

This application claims priority from Provisional Application Ser. No. 61/631,527, filed Jan. 5, 2012 of Tara Chand Singhal, titled, "A System Using GPS to Enhance Battery Life in Handheld Wireless Mobile Devices".

FIELD OF THE INVENTION

A system using GPS location to enhance battery life in cell phone devices is described. The system uses logic in the device that suppresses Registration-Request Signal transmission from the device when the current device location from the prior device location has not changed.

BACKGROUND

Battery life is a very important consideration in cell phone devices for a user of the device. Therefore, prior art has many technologies to improve battery life in such devices. One technological approach has been to use sophisticated algorithms in such devices to enhance the battery life. Another approach has been on improving the battery technologies themselves to be able to store more power in the batteries.

One such prior art on using algorithms to enhance battery life is based on the cellular network determining the distance of the device from a nearest cell tower based on measuring the strength of the received signal from the device. This information related to the distance of the cell phone from the nearest tower is then used to send data to the device on the control channel for the device to then dynamically calibrate the transmitting power of the device, based on this distance of the device from the nearest cell tower.

Another such prior art is based on using algorithms in the device itself to monitor different types of power uses in the device and manage them to minimize overall power consumption. One such example of managing power consumption is putting the display screen on low intensity or shutting off the screen automatically after a fixed time of non-use.

A prior art battery technology uses Lithium Ion batteries that store a large amount of power in a very compact size. As an illustration the typical capacity of a device battery is rated close to 1000 mAH for use in a cell phone.

Many more applications are being added to smart phones. Some examples are listening to music, using cameras with flash light, etc. Many more applications may be added in the future in such devices. Notwithstanding these prior art improvements in battery life technology, batteries in these devices provide power for only a limited time. These devices are dependent on battery for their operation. In addition to improving the battery technology itself, it is of paramount importance that the battery be used as efficiently as possible to enhance battery life.

Hence, it is an objective of the embodiments herein to provide for systems and methods to preserve and enhance battery life in cell phone devices.

SUMMARY

In a cellular telephone network, geographic space over which cellular service is provided is partitioned into a large number of geographic cells. Each geographic cell is about a few square miles and is covered by multiple cellular tower antennas. Coverage of a cell by three towers is preferred, as the three cell towers by measuring the relative strength of the cell phone transmission and by using triangulation can determine the location of the cell phone within the cell space.

This location of the cell phone within the cell itself is not required for the cellular telephone network operation itself. However, the cellular network may use this location information of the cell phone within the geographic cell for purposes other than cellular network operation. One such purpose is to support a federal 911 mandate. Another such purpose is to reduce the transmission power of the cell phone based on distance to the nearest tower to minimize battery usage and thus enhance battery life.

The cell phones are mobile and based on the cell phone owner's lifestyle and vocation, a cell phone may move within a cell space, not move at all, or move rapidly across many cells such as when the cell phone owner is in a vehicle in motion or is in flight. Thus, the cell phones may either not change their cell location or change their cell location slowly, or change rapidly and unpredictably. Therefore, as part of the cellular telephone network operation, it is necessary for the cellular network to know in which specific geographic cell the cell phone is physically located at any given time.

To provide that specific geographic cell location information to the cellular network, cell phones have been designed to periodically broadcast an identity signal, called Registration-Request Signal (RRS) that is used by the cellular network to determine and then save the geographic cell location of a wireless mobile cell phone in a network database. The network database is maintained by the cellular carrier and is referenced to and used for routing incoming calls to the specific cell where the cell phone is located.

Based on the speed and unpredictable nature with which a cell phone may move and thus potentially cross the geographic boundary of a cell, it is believed that the Registration-Request Signal (RRS) is broadcast by the cell phone periodically every few seconds. The RRS should not be confused with the roaming signal which uses the same Registration-Request Signal in a cell phone to operate in a cellular carrier area that is not covered by the home carrier with which the cell phone owner has contracted for the cell telephone service.

The location of the cell phone in a specific cell that is maintained in the cellular network database is used to route incoming calls to the geographic cell where the cell phone is located. These incoming calls may originate in any part of the landline and cellular network nationally or globally.

It is believed that this specific periodic broadcast feature of the Registration-Request Signal of the cell phone as part of the cellular network operation is used exclusively to route calls to the specific cell where the cellular phone is located and does not affect the operation of the cell phone in either originating or receiving calls to or from the cellular network. That is, if the cell phone is not updating the cell phone location in the network database, the cellular network would still route calls and route them to the last known cell location of the cell phone in the network database, and await a response from the cell phone to the routed call connection. The cellular telephone network need not be updated with the cell phone location in the network database unless that cell phone location changes out of that last known cell location.

As illustrated in Prior art FIG. 1A, a cell phone, as part of a cellular network operation and operating in conjunction with a cellular telephone network, periodically transmits a Registration-Request Signal to the network via the nearest cell towers. As illustrated In Prior art FIG. 1B, in the cell phone, a transmission record using the International Mobile Equipment Identifier (IMEI) data is created. The IMEI (International Mobile Equipment Identity) is a unique 17 or 15 digit code used to identify an individual mobile station to a GSM or UMTS network. IMEI data identifies a cell phone.

The RRS function of cell phone uses a clock signal to a timer in the RRS function. From this timer, when an elapsed time is equal to the time period, as for example, five seconds, and assuming that the RRS is transmitted every five seconds, a Registration-Request Signal transmission record is sent via a control channel of the network from the wireless transmission logic in the cell phone.

The wireless communication links have two different set of channels. One set is called control channels and the other is called data channels. The control channels are used for communicating control data and the data channels are used for actual data transmission. The cellular network uses these Registration-Request Signals from the cell phone devices to record and maintain in a database the current cell location of the device. The database is used by the global telephone network to determine the current cell location of the device so that the incoming calls are routed to the specific cell where the device is located.

Further, the strength of the R-R Signal, as received at a cell tower, is used by the cellular network to compute the distance of the cell phone from the tower, and send control channel data to the cell phone for the cell phone to be able to visually display the strength of the signal and thus the closeness to the tower and at the same time use this data to program the cell phone's signal transmission strength.

If a cell phone is taken into an area, such as in a basement of a building, the cell phone cannot maintain this communication link with the cell tower and the visual display of signal strength on the cell phone display displays a state of "no signal". When the cell phone is taken back into an area where the cell phone can establish a communication link with the cell tower, after the passage of time of some seconds, visual display of the signal strength bars returns on the cell phone display.

Further, as a simplified illustration, a vehicle traveling at 60 mph moves 5280 feet in one minute or sixty seconds, or moves at the rate of 88 feet/second. That means a cell phone in such a moving vehicle may move 264 feet every three second or 440 feet every five seconds. Such a distance is considered significant for the cellular network operation and therefore, it is believed that the R-R signal is transmitted at a rate close to either 3 second or 5 second. Thus it is believed, as part of a cellular network operation, the cell phone is sending an R-R signal every so often, and believed to be every five seconds.

It is believed, the Registration-Request Signal is transmitted every few seconds at full power from the cell phone device. In a simplified illustration, assuming a five second transmission rate, 17,280 such Registration-Request Signal transmissions are made in a 24 hour period. The idle life of the cell phone battery is about eight days or about 200 hours. The number of Registration-Request Signal transmissions in 8 days is about 138,240. The battery capacity is rated at approximately 950 mAH. In addition to powering the phone in the idle mode, the battery capacity is used in the transmission energy of transmitting the RRS every few seconds.

As a simplified approximation, this battery capacity is then depleted in 138,240 transmissions in idle or standby mode. Therefore, the power consumption in each Registration-Request Signal transmission based on this simplified illustration is estimated by 950 mAH divided by 138,240 or equal to 0.00687 mAH. If a large percentage of these Registration-Request Signal transmissions can be avoided, a significant enhancement in the life of the battery is believed possible.

In practical reality the cell phone is not moving for the better part of a 24 hour day and is in a fixed location and thus in a fixed cell. In a typical use of a cell phone, as an assumption, it may be mobile or move about 10% or 2.4 hours in a 24 hour day out of its original cell location, such as to travel to and from the office to home.

Therefore, the cell phone is transmitting the Registration-Request Signal for 90% of the time when it does not need to do so if the cell location where the cell phone is located has not changed during that time. Thus based on this simplified illustration, 90% of 17,280 Registration-Request Signal transmissions in a 24 hour period need not be made. When 90% or 15,552 transmissions, each consuming close to 0.00687 mAH, are not made, a battery consumption saving of 15,552×0.00687=107 mAH or roughly 11.25% in a 24 hour day is believed possible. That provides for a significant enhancement in the life of the battery.

It is not easy to predict when the cell phone of an individual user would move and if it does move how much does it move relative to a cell space, as that would be a function of the lifestyle and cell phone use characteristics of an individual. Further, it is not easy to predict when the cell phone would move in a vehicle requiring constant transmissions of the Registration-Request Signal, as currently provided in the prior art technology. The location of the cell phone would change rapidly based on the speed of the vehicle.

The embodiments described herein provide a Registration-Request Signal Transmission Management (RRSTM) logic that would manage and optimize the Registration-Request Signal transmissions from the cell phone device based on the individual user behavior of using a cell phone. That is, the RRSTM logic would determine when the cell phone has moved and how much it has moved relative to a geographic cell and use that information to either suppress or not suppress prior art Registration-Request Signal transmissions. The RRSTM logic, it is believed, would provide a significant enhancement to the life of a battery in a cell phone.

Dynamically adjusting the rate of Registration-Request Signal transmission that is made possible by the RRSTM logic does not affect the cellular operation of the cell phone as had been described above. The prior art Registration-Request Signal transmissions work independently of the actual use of a cell phone for receiving and initiating calls to other phones.

A cell phone working in conjunction with a cellular network uses control channels and data channels. The control channel is used for communicating and exchanging control data such as, the R-R signal, and to communicate the identification of voice/data channels to be used for a given voice/data connection. Hence, the use of the control channel for the R-R signal transmission does not affect the operation of the cell phone in sending and receiving voice and data transmissions.

These and other aspects of the embodiments herein are further described in detail with the help of the accompanying drawings and the description, where similar number are used to identify the features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 1 is a prior art block diagram that illustrates the transmission of Registration-Request Signals from a cell phone to the cellular network;

FIG. 2D is a block diagram that illustrates functions of the Device Location Change function of the Registration-Request Signal transmission management logic in the cell phone for managing Registration-Request transmissions;

FIGS. 4A and 4B are block diagrams that illustrate typical enhancements in the life of a battery using the logic of the embodiments; and FIG. 5 is method diagram for enhancements in the life of a battery using the logic of the embodiments described herein.

DESCRIPTION

Introduction

Figure 2A:
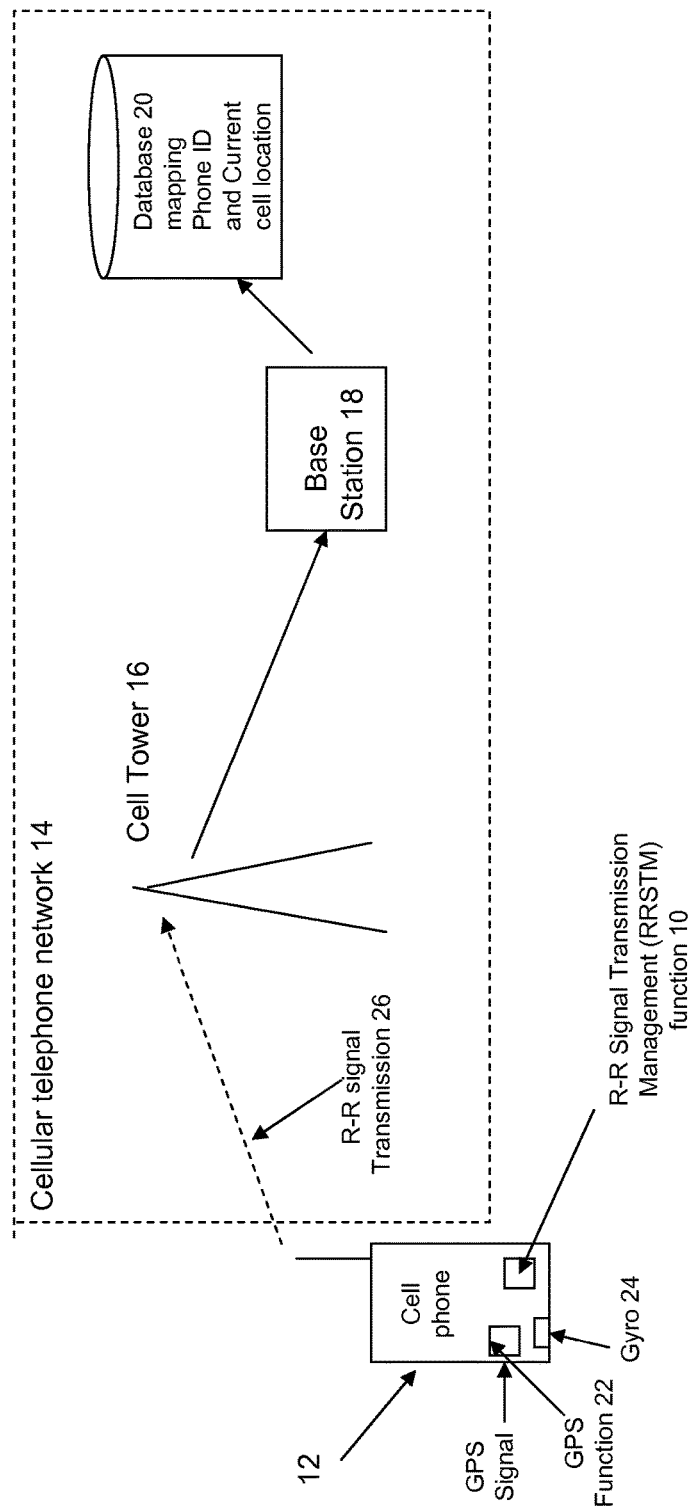
FIG. 2A is a block diagram that illustrates features of the embodiments that provide for logic in the cell phone for managing Registration-Request transmissions.
Figure 2B:
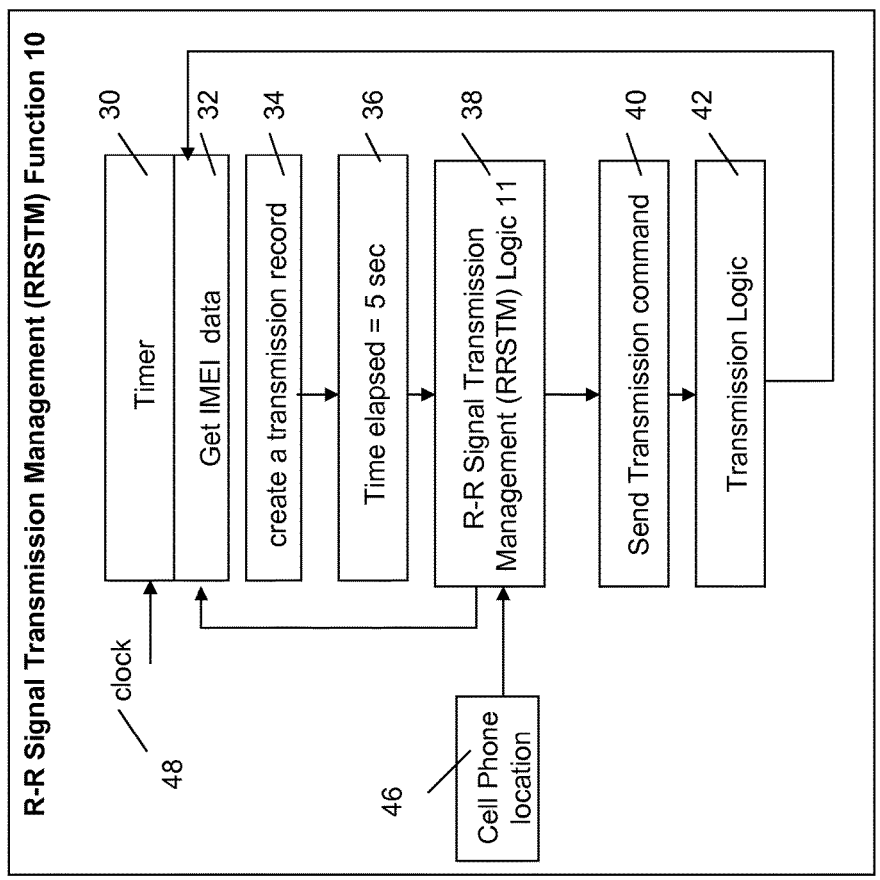
FIG. 2B is a block diagram that illustrates functions of the Registration-Request Signal transmission management logic in the cell phone for managing Registration-Request transmissions.
Figure 2C:
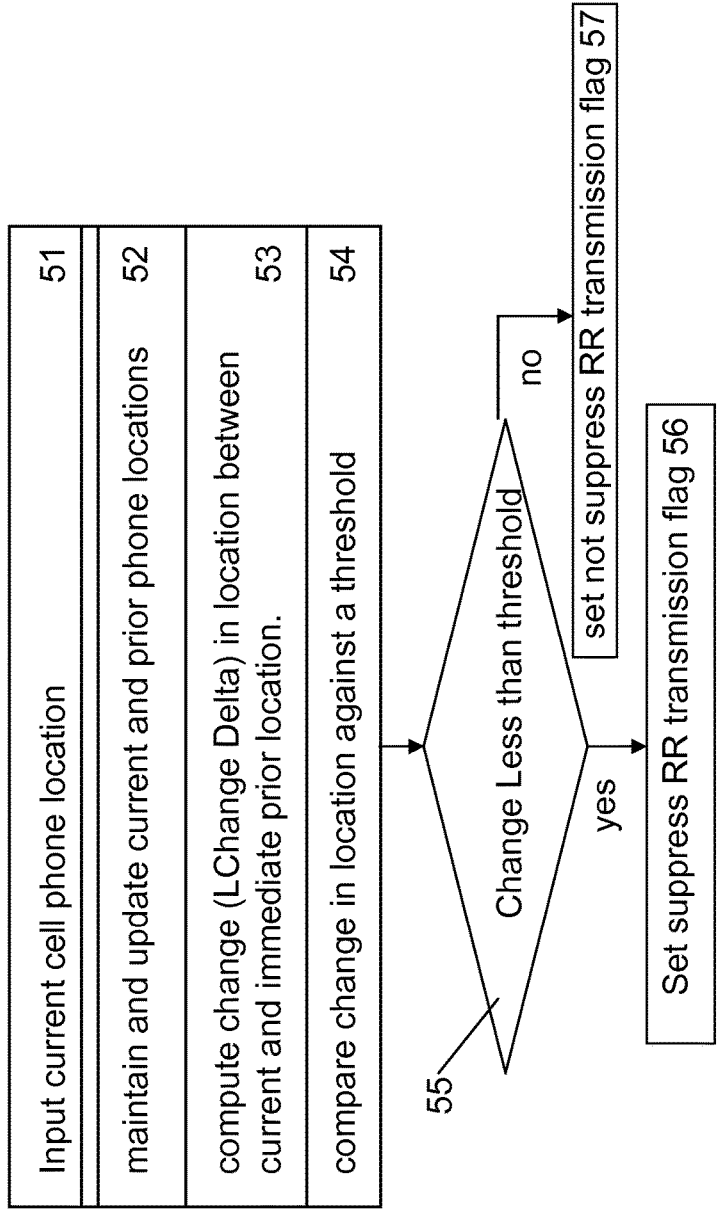
FIG. 2C is a block diagram that illustrates functions of the Registration-Request Signal transmission management logic in the cell phone for managing Registration-Request transmissions.

FIGS. 2A, 2B and 2C illustrate features of a Registration-Request Signal Transmission Management (RRSTM) function 10 and RRSTM logic 11 that is stored in and executes from a memory of cell phone device 12.

The RRSTM function 10 suppresses the transmission of prior art Registration-Request Signal transmissions from a cell phone device when the cell phone device has not changed location and does not suppress these prior art Registration-Request Signal transmissions when the cell phone device has changed location from a prior immediate location.

RRSTM function 10 also does not suppress these prior art Registration-Request Signal transmissions when the function 10 detects the physical location of the cell phone device is rapidly changing as in a moving vehicle.

Different embodiments of the RRSTM function 10 are illustrated with the help of Flow Diagram FIGS. 3A, 3B, 3C, and 3D. These embodiments are illustrative only and other embodiments are not ruled out.

FIGS. 4A and 4B illustrate simplified illustrations on how much the battery life is enhanced using RRSTM function 10 with different modes of cell phone use. FIG. 5 illustrates a method diagram.

These and other aspects of the embodiments herein are described in detail, where the headings are provided for reader convenience.

Cell Phone Device 12

FIG. 2A illustrates a cell phone device 12 working in conjunction with a cellular network 14. The network 14 has cell tower 16, base station 18 and cell phone cell location database 20. The device 12 has an RRSTM function 10 of the embodiments herein. The device 12 also has prior art GPS function 22. The RRSTM function 10 manages the Registration-Request Signal transmissions 26 that are transmitted from the device 12 to the network 14.

Due to the 911 Federal legislation requirement to provide cell phone location within a specified distance to the emergency responders, cell phone manufacturers have incorporated GPS in each phone by default. Since the GPS function may not be operative all the time or provide the location precision that may be required to support 911 calls, the cell phones may also incorporate a gyro mechanism and a function to provide a precise cell phone location in the cell phone. Hence, the device 12 may also have prior art gyro function 24 that is provided in many prior art smart phones. The device manufacturers have an incentive and an interest in incorporating gyro functions in a smart phone as the gyro function may also support many current and new applications in the smart phones, in addition to supporting the precise location determination of the phone in conjunction with the GPS function.

RRSTM Function 10

FIG. 2B illustrates the RRSTM function 10. There is a timer function 30 that is driven by a clock signal 48. Part of the phone logic keeps phone identification data called IMEI. A function 32 gets the IMEI data. A function 34 creates a transmission record using the IMEI data. A function 36 then checks the timer to see if the time elapsed is equal to five seconds. The sequence of functions 34 and 36 may be reversed.

The RRSTM function 10 requires input of cell phone location 46. If the time elapsed is five seconds, the RRSTM logic 11 is activated. The details of the RRSTM logic 11 are described later with the help of FIG. 2C.

When the control returns from the RRSTM logic 11 to the RRSTM function 10, and based on the results of computation in the logic 11, either the function 40 to send transmission command is executed or the function 32 to create a next loop is executed. If function 40 is executed then the function 42 executes the transmission logic. After function 42 is executed the control returns to function 32.

FIG. 2C illustrates the functions of the RRSTM logic 11. These logic steps are: (i) input current cell phone location 51, (ii) maintain and update prior and current phone locations, 52 (iii) compute change in location (LChangeDelta) between current and immediate prior location 53, (iv) compare change in location (LChangeDelta) against a threshold 54, (v) if change less then threshold 55, set suppress RR transmission flag 56 and if change not less than threshold, set not suppress flag 57. Then the control returns to RRSTM function 10.

Device Location Change (DLC) Function 12

In some embodiments the device 12 may on its own determine its position within a cell space and use that information to decide to, suppress or not suppress, R-R signals. For such embodiments a Device Location Change function may be used that is stored in and operative from the memory of the device 12.

FIG. 2D illustrates the functions of such a Device Location Change (DLC) function 12. These functions are (i) download and store cell space boundary data in the device storage that defines cell space boundaries in a geographic region 58, (ii) use the boundary data and the LChangeDelta to determine movement of device within and out of a cell space 59, and (iii) update boundary data when the region changes 60.

The function 58 is used to download and store cell space boundary data in the storage memory of the device. The boundary data may be defined by cell identification and its boundary stated in latitude and longitude of the corners of the space. If the space is a hexagon space as the cell space is designed, the boundary data may be defined by a hexagon-shape figure by identifying each of the corners by their lat/long.

Movement of the cell phone device within a cell area may be determined by maintaining a table (not shown) that identifies the geographic boundary of cells. Such a table may be maintained by the cellular carrier and copied into the cell phone device and may be loaded at the time when the phone is first used. The cell geographic boundaries are not likely to change over time as the cell towers are fixed. Such data may be kept in a format that would be easy to fetch and input to the function 60, required to compare to the current location of the device in lat/long. Hence function 59 would input the previous device location, the LChangeDelta from that location and the boundary id.

RRSTM Logic 11

Figure 3A:
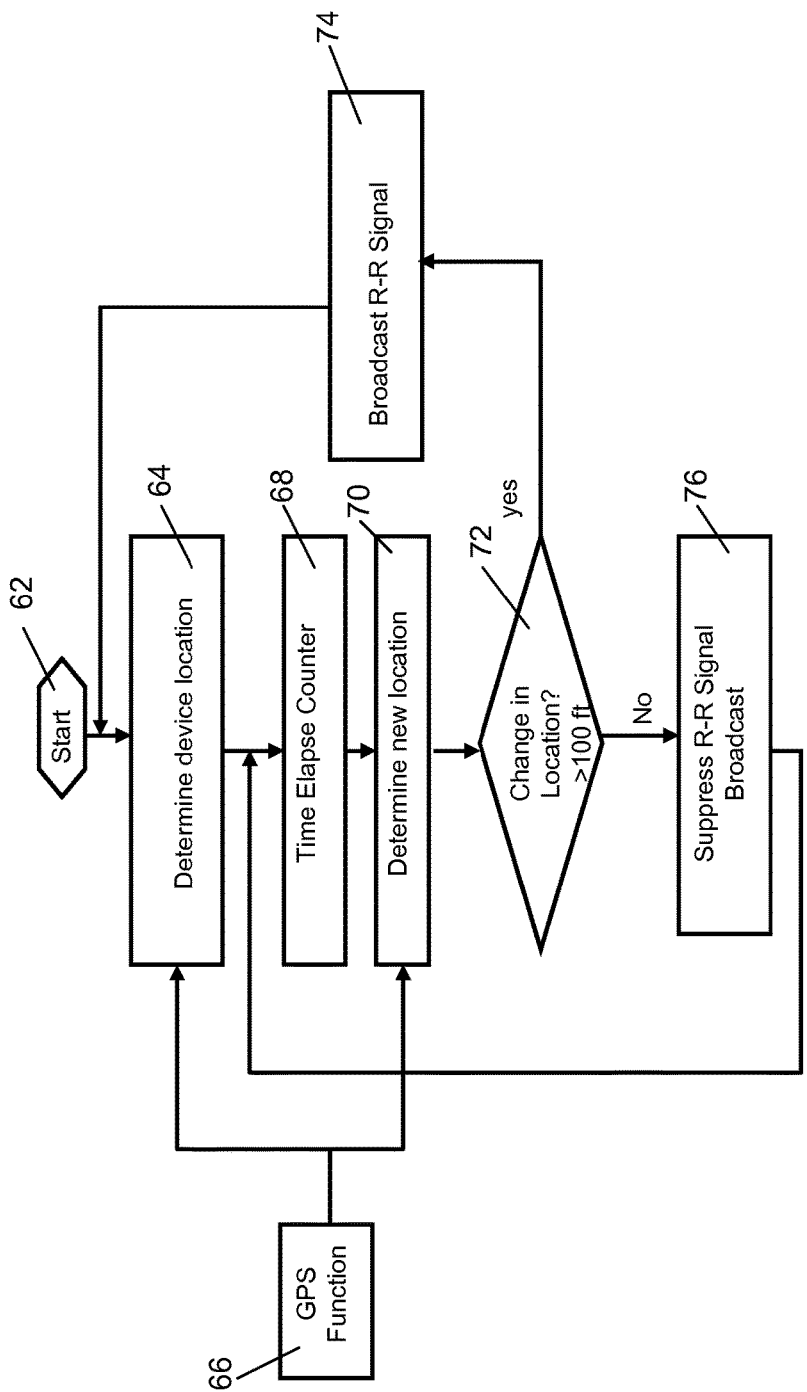
FIGS. 3A, 3B, 3C, and 3D are method diagrams that illustrate features of different embodiments of the Registration-Request Signal Transmission Management logic.

As illustrated in FIG. 3A, the logic has the basic steps as illustrated. In this basic logic, the cell phone location as determined by GPS function may be sufficient for the operation of the RRSTM logic. The steps are self explanatory as follows. The logic starts 62. At step 64, the device location with the help of GPS function 66 is determined. At step 68, time elapsed counter is checked. At step 70 the new location of the device with the help of GPS function 66 is determined. At step 72, if the change in two locations is determined and if the change is greater than 100 feet, then at step 74, the RR signal is broadcast or its broadcast is not suppressed. If the change is less than 100 feet, then the broadcast of the RR signal is suppressed at 76 and then loop back to step 64 to begin a new loop.

The figure of 100 feet in step 72 is used as an illustration to illustrate how the logic works. The GPS may not provide a location precision equal to or less than 100 feet change is location. The figure 100 feet may be any number that represents a threshold for the change in location for which the RR broadcast is either suppressed or not suppressed. The figure of 100 feet may be chosen to represent that the device has not moved at all from its present location for the purpose of the RR logic.

Figure 3B:
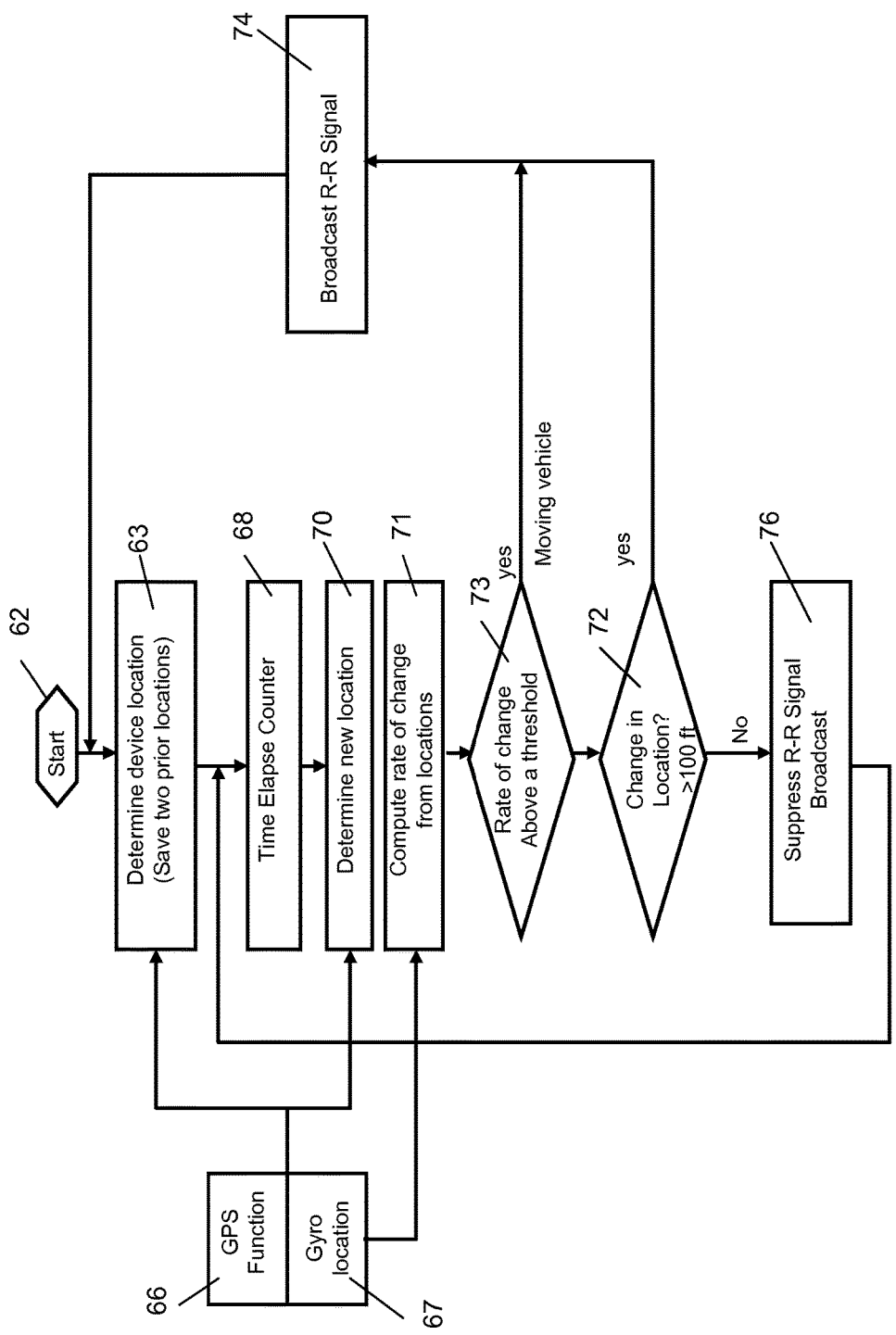

As illustrated in FIG. 3B, the logic has the steps as illustrated. In FIG. 3B, a rate of location change logic steps 71 and 73 have been added that determine if the cell phone is in a vehicle in motion. Further many phones now come equipped with a gyro function 67 that can more precisely determine change is location and that may work in conjunction with the GPS function 66. In that case the logic to suppress Registration-Request Signal transmissions is bypassed and the logic continuously loops to detect a change in the movement of the cell phone.

Figure 3C:
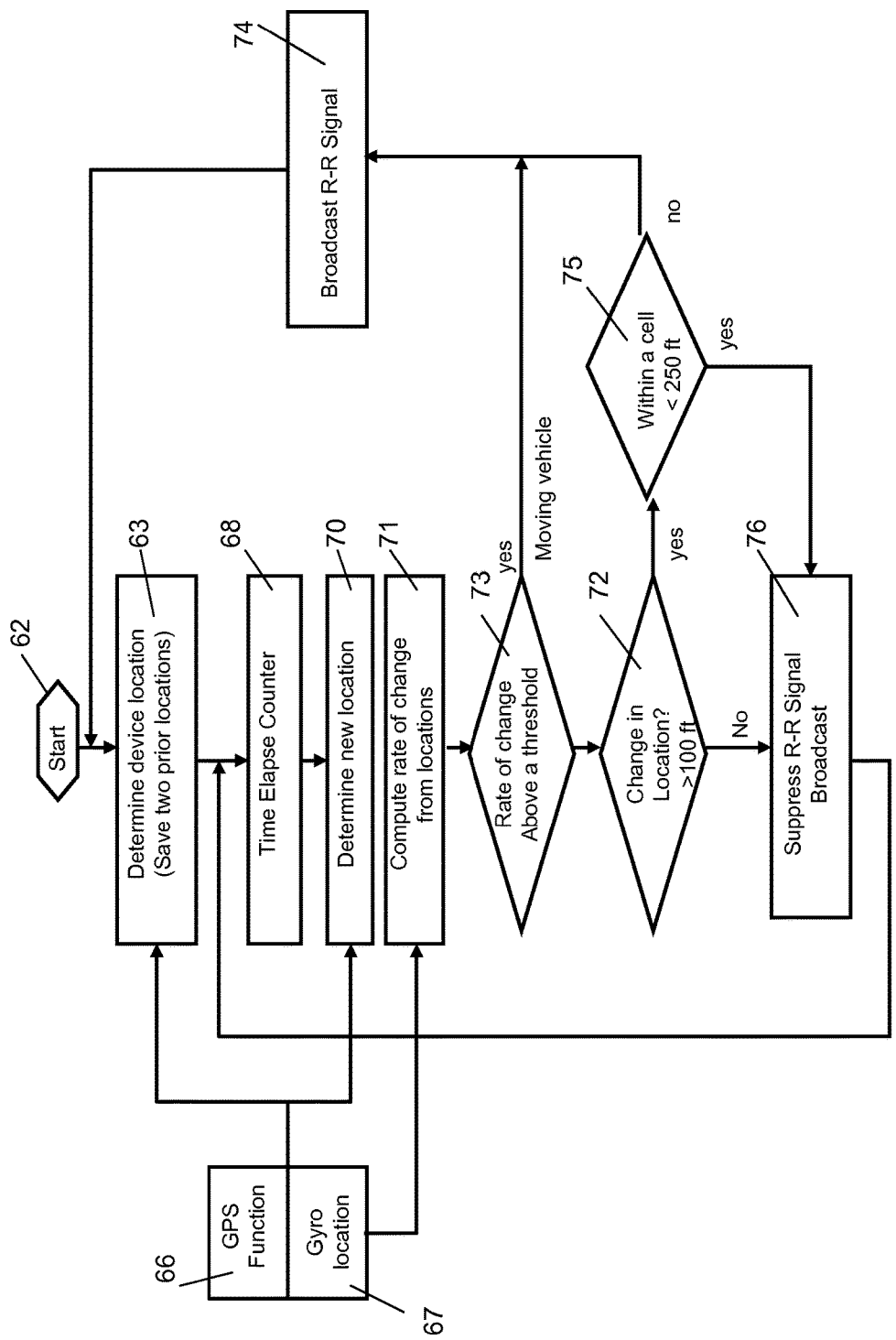

As illustrated in FIG. 3C, the logic has the same steps as FIG. 3B, except logic step 75 has been added to detect movements of cell phone that are less than 250 ft. That is while there may be localized movement of the cell phone, that movement still keeps the cell phone in the same cell.

In FIGS. 3B and 3C, the location data from the GPS function 22 may be supplemented with the Gyro function 24 determined location, when the change in movement is small or cannot be determined at the rate of the elapsed timer.

Figure 3D:
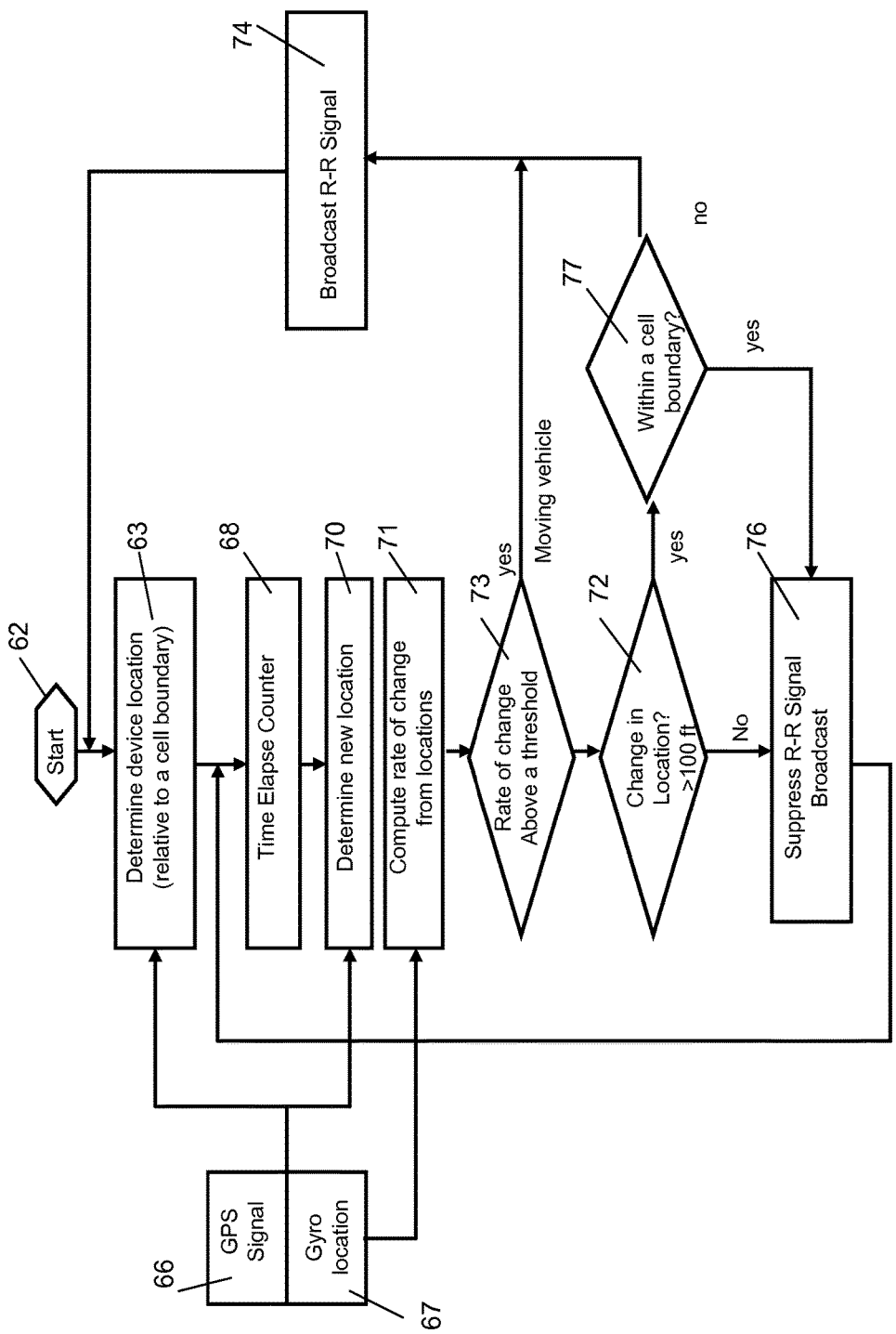

As illustrated in FIG. 3D, the logic has the same steps as FIG. 3C, except logic step 77 has been added in lieu of step 75 to detect location and movements of cell phone with in a cell space boundary. That is, while there may be localized movement of the cell phone, that exceeds a threshold such as 250 feet, that movement still keeps the physical location of the cell phone in the same geographic cell. Earlier described Device Change Location function 12 may be used for that purpose to determine if the cell phone movements have changed cell location of the cell phone or the cell phone is within its current cell space.

Movement of the cell phone device within a cell may be determined by the DLC function 12 as described earlier. The cell geographic boundaries are not likely to change over time as the cell towers are fixed. Therefore at step 77, the current GPS/Gyro location of the cell phone device is compared with the boundary of a geographic cell at the time interval. When a new location of the device comes close to a boundary of the cell, within a threshold, the RR signal would not be suppressed.

Any of the four logic steps described with the help of FIGS. 3A, 3B, 3C or 3D may be used in the cell phone device. Each of the logic offers a progressively refined or more complex logic to how to use the cell phone device location for the purpose of suppressing or not suppressing the RR signal transmission. The cell phone device makers may choose to decide which of these may be implemented by the logic that would serve their purpose best.

As an option, the cell phone device user may be provided settable parameter to enhance the battery life of their smart phone device by activating RRSTM function 10. The user may also be provided the option to be able to set the threshold of movement that would suppress R-R signal transmissions from a one of the provided choices such as 100 ft, 200 ft, 300 ft, 400 ft, or 500 ft.

Alternatively, the cell device manufacturers working in conjunction with the cellular telephone carriers may customize the cell phone devices that work in their network to enhance the user experience of enhanced battery life.

A system that enhances life of a battery in cell phone devices that work in conjunction with a cellular telephone network has a Registration-Request Signal transmission management function that operates in the device and periodically detects change in physical location of the device from an immediate prior location, called an LchangeDelta. The function, if the LchangeDelta is below a threshold (100 ft), suppresses a prior art Registration-Request Signal transmission from the device to the cellular network.

The function, if the LchangeDelta is above a threshold (250 ft), does not suppress the prior art Registration-Request Signal transmission from the device to the cellular network.

The periodic location change detection period is the same (3 second) with which a prior art device transmits a Registration-Request Signal to the network.

The system may have a function that computes a rate of change of location and if the rate is above a threshold, indicative of a rapidly moving physical location, the function does not suppress the prior art Registration-Request Signal transmissions to the network.

The system may have a function to detect a previous and a current location of the cell phone device, receives location inputs from a combination of a GPS function and a gyro function in the device to have a more precise cell phone location to compute the change is location and the rate of change in location of the cell phone device.

A system that enhances life of a battery in cell phone devices that work in conjunction with a cellular telephone network has a Registration-Request Signal transmission management function that operates in the device and periodically detects change in physical location of the device from an immediate prior location, called an LchangeDelta. The function, if the LchangeDelta keeps the device in a cell space boundary, suppresses a prior art Registration-Request Signal transmission from the device to the cellular network.

The function, if the LchangeDelta moves a device out of the cell boundary, does not suppress the prior art Registration-Request Signal transmission from the device to the cellular network.

A system that enhances life of a battery in cell phone devices that work in conjunction with a cellular telephone network has a Registration-Request Signal Transmission Management (RRSTM) function that operates in the cell phone device.

The system also has a Device Location Change (DLC) function periodically detects a change in physical location of the device from an immediate prior location, the change called an LchangeDelta.

The RRSTM function, if the LchangeDelta is below a threshold, suppresses a Registration-Request Signal transmission from the device to the cellular network.

The RRSTM function, if the LchangeDelta is above a threshold, does not suppress the Registration-Request Signal transmission from the device to the cellular network.

The periodic detection period is one of from a set of 3 seconds, 5 seconds, 10 seconds, 15 seconds, 20 seconds, 30 seconds, 1 minute, 5 minutes, 10 minutes, 15 minutes, 30 minutes, and 60 minutes.

Method of Operation

As illustrated with reference to FIG. 5, a method for enhancing life of a battery in cell phone devices that work in conjunction with a cellular telephone network has the following steps where all the steps may not be used or used in the order specified.

At step 100, detecting periodically, in the device, a change in physical location of the device from an immediate prior location, the change called an LchangeDelta.

At step 102, suppressing a Registration-Request Signal transmission from the device to the cellular network, if the LchangeDelta is below a threshold.

At step 104, not suppressing the prior art Registration-Request Signal transmission from the device to the cellular network, if the LchangeDelta is above a threshold.

At step 106, using the same location change periodic detection period with which a prior art device transmits a Registration-Request Signal to the network.

At step 108, computing a rate of change of location and if the rate is above a threshold, for a rapidly moving location, do not suppress the prior art Registration-Request Signal transmission to the network.

At step 110, receiving a previous and a current location of the device from a combination of a GPS function and a gyro in the device.

As illustrated in FIG. 4A, a simplified illustration of the enhancement in battery life in an idle mode computation is shown. Based on these simplified illustration for this mode, almost 855 mAH of the battery capacity is saved by suppressing Registration-Request Signal transmissions for the life of the battery and thus extend the idle use life of the battery from eight days to approximately 80 days.

As illustrated in FIG. 4B, the enhancement in battery life, in typical communication day use mode computation, are shown. Based on these simplified illustration for this mode, 104 mAH of the battery capacity per day is saved by suppressing Registration-Request Signal transmissions in a day and thus extend the communication use life of the battery from 3 hours to 3 hours and 20 minutes, a more than ten percent phone communication use increase per day.

These improvements in battery life, as illustrated with the help of simplified illustration in FIGS. 4A and 4B enable the device to be used for a longer time between charging the battery and assure the users that their battery would last to address unexpected emergencies when the battery had not been charged.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A cell phone device, equipped with a GPS receiver and a GPS location determination function, comprising:
   a Registration-Request (R-R) logic in the cell phone device that periodically transmits to the cell towers of a wireless network, with a fixed time period, a R-R signal from the cell phone device, wherein the R-R signal is for use by the wireless network to record the physical location of the cell phone with reference to cell towers that had picked up the transmission of the R-R signal, for the purpose of routing an incoming call to the cell phone device;
   an over-ride logic, operating in the cell phone device, wherein the over-ride logic modifies the R-R logic by suppressing the periodic transmission of the R-R signal to the wireless network, wherein the suppression of the R-R signal transmission is ad-hoc, wherein the suppression being based on an individual physical movement of a cell phone device owner;
   the over-ride logic, using the GPS function, periodically detects a change in physical location of the cell phone device from an immediate prior location, the change called an LchangeDelta, wherein the LchangeDelta is an ad-hoc distance being based on the individual physical movement of the cell phone device owner;
   the over-ride logic, if the LchangeDelta is less than a distance threshold, suppresses the transmission of the R-R Signal from the device, wherein if the LchangeDelta is greater than the distance threshold the over-ride logic does not suppress transmission of the R-R Signal.

2. The cell phone device as in claims 1 further comprising:
   the distance threshold is preset in the over-ride logic and selected from one from a group of, 50 feet, 100 feet, 150 feet, 200 feet, 250 feet, 300 feet, 400 feet and 500 feet.

3. The cell phone device as in claims 1, wherein:
   the over-ride logic periodically detects the change in physical location with a time period from one of from a set of 3 seconds, 5 seconds, 10 seconds, 15 seconds, 20 seconds, 30 seconds, 1 minute, 5 minutes, 10 minutes, 15 minutes, 30 minutes, and 60 minutes.

4. The cell phone device as in claims 1, wherein:
   the over-ride logic makes a rate of the periodic detection of the change in location of the cell phone device equal to the fixed time period with which the cell phone device performs Registration-Request Signal transmission from the device.

5. The cell phone device as in claim 1, further comprising:
   the over-ride logic computes a rate of change of the physical location and if the rate of change is above a threshold, indicative of a rapidly moving physical location, the over-ride logic does not suppress the Registration-Request Signal transmission from the device.

6. The cell phone device as in claim 1, further comprising:
the over-ride logic to detect a previous and a current location of the device receives location inputs from a combination of the GPS function and a gyro function in the device.

7. A method for a cell phone device, equipped with a GPS receiver and a GPS location determination function, the method comprising the steps of:
providing a Registration-Request (R-R) logic in the cell phone device that periodically transmits to the cell towers of a wireless network, with a fixed time period, a R-R signal from the cell phone device, wherein the R-R signal is for use by the wireless network to record the physical location of the cell phone with reference to cell towers that had picked up the transmission of the R-R signal, for the purpose of routing an incoming call to the cell phone device;
providing an over-ride logic, operating in the cell phone device, wherein the over-ride logic modifies the R-R logic by suppressing the periodic transmission of the R-R signal to the wireless network, wherein the suppression of the R-R signal transmission is ad-hoc, wherein the suppression being based on an individual physical movement of a cell phone device owner;
detecting periodically by the over-ride logic, using the GPS function, a change in physical location of the cell phone device from an immediate prior location, the change called an LchangeDelta, wherein the Lchange-Delta is an ad-hoc distance being based on the individual physical movement of the cell phone device owner;
suppressing by the over-ride logic, if the LchangeDelta is less than a distance threshold, the transmission of the R-R Signal from the device, wherein if the Lchange-Delta is greater than the distance threshold the over-ride logic does not suppress transmission of the R-R Signal.

8. The method as in claim 7 further comprising the steps of:
presetting in the over-ride logic the distance threshold as selected one from a group of, 50 feet, 100 feet, 150 feet, 200 feet, 250 feet, 300 feet, 400 feet and 500 feet.

9. The method as in claim 7, further comprising:
detecting by the over-ride logic periodically the change in physical location with a time period from one of from a set of 3 seconds, 5 seconds, 10 seconds, 15 seconds, 20 seconds, 30 seconds, 1 minute, 5 minutes, 10 minutes, 15 minutes, 30 minutes, and 60 minutes.

10. The method as in claim 7, further comprising:
selecting a rate of the periodic detection of the change in location of the cell phone device, in the over-ride logic equal to the fixed time period with which the cell phone device performs R-R signal transmission from the device.

11. The method as in claim 7, further comprising:
computing by the over-ride logic a rate of change of location of the cell phone device and if the rate of change is above a threshold, indicating a rapidly moving location, not suppressing the transmission of the Registration-Request Signal.

12. The method as in claim 7, further comprising:
receiving by the over-ride logic a previous and a current location of the cell phone device from a combination of the GPS function and a gyro function in the device.

13. A system that enhances life of a battery in cell phone devices, equipped with GPS receivers and GPS location determination functions, the system comprising:
a Registration-Request (R-R) logic in the cell phone device that periodically transmits to the cell towers of a wireless network, with a fixed time period, a R-R signal from the cell phone device, wherein the R-R signal is for use by the wireless network to record the physical location of the cell phone with reference to cell towers that had picked up the transmission of the R-R signal, for the purpose of routing an incoming call to the cell phone device;
an over-ride logic, operating in the cell phone device, wherein the over-ride logic modifies the R-R logic by suppressing the periodic transmission of the R-R signal to the wireless network, wherein the suppression of the R-R signal transmission is ad-hoc, wherein the suppression being based on an individual physical movement of a cell phone device owner;
the system has a Device Location Change (DLC) logic that maintains a boundary data of a cell space and determines the LChangeDelta in that boundary space;
the over-ride logic, if a scope of the movement of the cell phone device as determined by LchangeDelta keeps the cell phone device in the cell space boundary, the over-ride logic suppresses the R-R signal transmission from the cell phone device, and thereby enhances the life of the battery.

14. The system as in claim 13, further comprising:
the over-ride logic, if the LchangeDelta moves a device out of the cell boundary, does not suppress the prior art Registration-Request Signal transmission from the device.

15. The system as in claim 13, further comprising:
the over-ride logic periodically detects the change in physical location with a time period from one of from a set of 3 seconds, 5 seconds, 10 seconds, 15 seconds, 20 seconds, 30 seconds, 1 minute, 5 minutes, 10 minutes, 15 minutes, 30 minutes, and 60 minutes.

16. The system as in claim 13, further comprising:
the over-ride logic computes a rate of change of location and if the rate is above a threshold, indicative of a rapidly moving physical location, does not suppress the Registration-Request Signal transmission from the device.

17. The system as in claim 13, further comprising:
the over-ride logic to detect a previous and a current location of the device receives location inputs from a combination of the GPS function and a gyro function in the device.

18. The system as in claim 13, further comprising:
the Device Location Change (DLC) logic maintains data that is used for identifying a boundary of a cell space and determines the LChangeDelta in that boundary space.

19. The system as in claim 13, further comprising:
the Device Location Change (DLC) logic updates and maintains data that is used for identifying a boundary of a cell space in a physical geographic area and determines the LChangeDelta in that boundary space.

20. The system as in claim 19, further comprising:
the Device Location Change (DLC) logic updates data that is used for identifying a boundary of a cell space in a physical geographic area from the cellular network.

* * * * *